(12) United States Patent
Brandt et al.

(10) Patent No.: US 8,945,905 B2
(45) Date of Patent: Feb. 3, 2015

(54) CAT LITTER FORMULATION

(76) Inventors: Russell L. Brandt, Gilbert, AZ (US);
Elizabeth A. Battilana, Phoenix, AZ (US)

(*) Notice: Subject to any disclaimer, the term of this patent is extended or adjusted under 35 U.S.C. 154(b) by 41 days.

(21) Appl. No.: 13/179,447

(22) Filed: Jul. 8, 2011

(65) Prior Publication Data
US 2012/0006276 A1 Jan. 12, 2012

Related U.S. Application Data

(60) Provisional application No. 61/362,594, filed on Jul. 8, 2010.

(51) Int. Cl.
| | | |
|---|---|---|
| *C12N 1/00* | (2006.01) | |
| *C02F 3/34* | (2006.01) | |
| *A01K 29/00* | (2006.01) | |
| *A01K 1/015* | (2006.01) | |

(52) U.S. Cl.
CPC ............. *A01K 1/0152* (2013.01); *A01K 1/0155* (2013.01)
USPC ..................... 435/243; 435/252.1; 435/252.4; 435/262; 119/171

(58) Field of Classification Search
USPC ............ 435/243, 252.1, 252.4, 262; 119/171, 119/172, 173
See application file for complete search history.

(56) References Cited

U.S. PATENT DOCUMENTS

| | | | | |
|---|---|---|---|---|
| 5,135,743 A | * | 8/1992 | Stanislowski et al. | 424/76.6 |
| 5,634,431 A | * | 6/1997 | Reddy et al. | 119/173 |
| 5,664,523 A | * | 9/1997 | Ochi et al. | 119/173 |
| 6,053,125 A | * | 4/2000 | Kory et al. | 119/171 |
| 6,089,189 A | * | 7/2000 | Goss et al. | 119/173 |
| 2006/0188978 A1 | * | 8/2006 | Grant | 435/252.5 |

FOREIGN PATENT DOCUMENTS

EP         1838826 B1 * 4/2010

OTHER PUBLICATIONS

Qadri et al, Rapid test for determination of urea hydrolysis. Antonie van Leeuwenhoek, vol. 50 (1984) p. 417-423.*

Rajmohan et al., Enzymes from isolates of *Pseudomonas fluorescens* involved in food spoilage. Journal of Applied Microbiology, vol. 93 (2002) pp. 205-213.*

Kamboh et al, Biochemical Properties of Bacterial Contaminants Isolated from Livestock Vaccines. Pakistan Journal of Nutrition, vol. 8 No. 5 (2009) pp. 578-581.*

*Bacillus amyloliquefaciens*. ABIS Encyclopedia, 2013 [retrieved on Apr. 30, 2013] Retrieved from the internet <URL: http://www.tgw1916.net/Bacillus/amyloliquefaciens.html>.*

*Paenibacillus lactis*. ABIS Encyclopedia, 2013 [retrieved on Apr. 30, 2013] Retrieved from the internet <URL: http://www.tgw1916.net/Bacillus/lactis.html>.*

Davies. About Humic Acid. Northeastern University, 2012 [retrieved on Apr. 30, 2013]. Retrieved from the internet <URL: http://www.northeastern.edu/hagroup/about/>.*

* cited by examiner

*Primary Examiner* — Jon P Weber
*Assistant Examiner* — Kara Johnson
(74) *Attorney, Agent, or Firm* — Dale F. Regelman; Quarles & Brady LLP

(57) ABSTRACT

A waste capture media formulation comprising a bacteria package. The bacteria package does not include a bacteria that produces a urease enzyme. The formulation further comprises an absorbent media, an odor suppressant, a binding agent, a mineral source, a masking agent, and an aqueous surfactant.

16 Claims, 1 Drawing Sheet

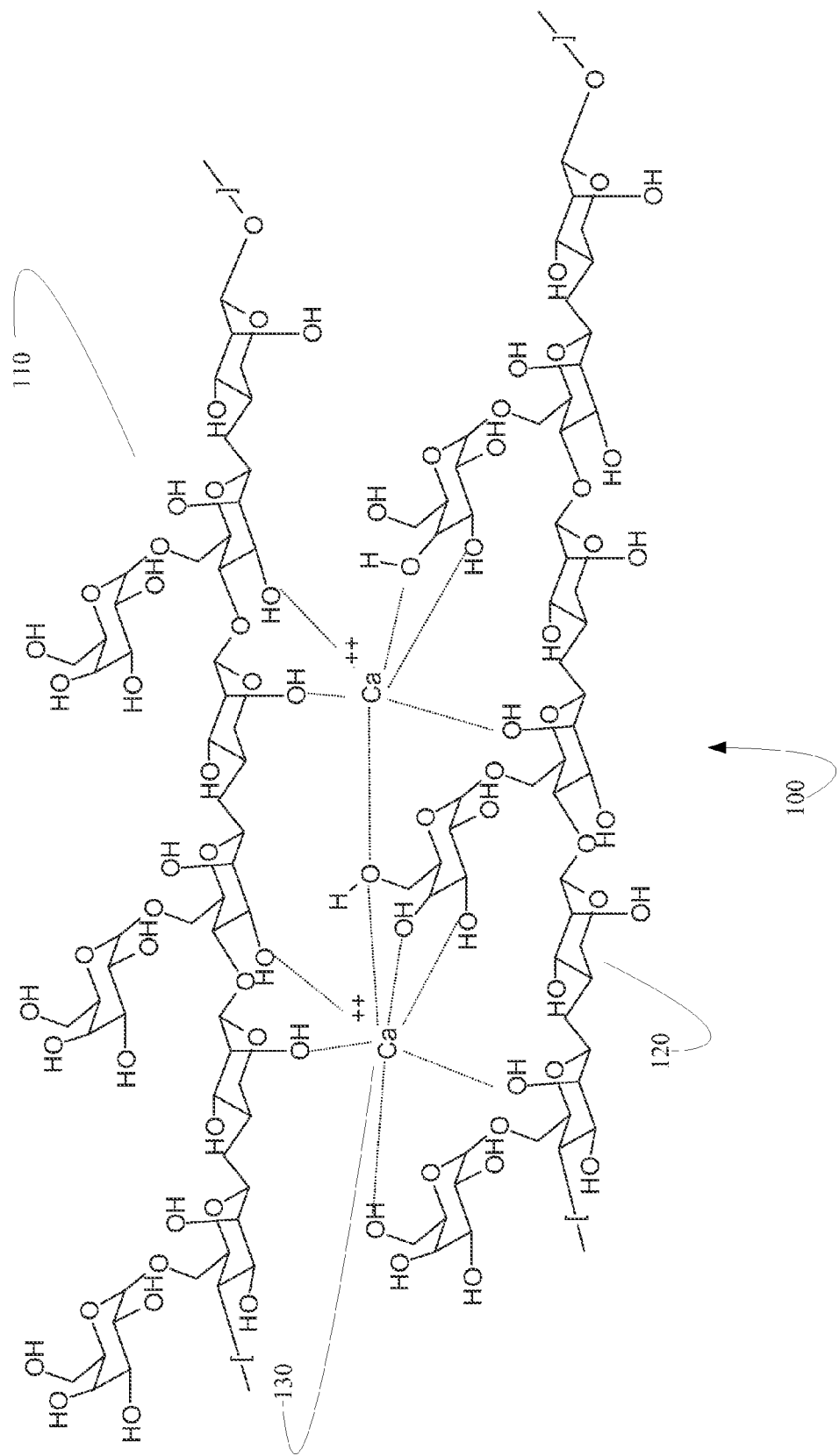

CAT LITTER FORMULATION

RELATED APPLICATIONS

This patent application claims priority to U.S. Provisional Application No. 61/362,594 filed on Jul. 8, 2010.

TECHNICAL FIELD

The present invention relates to a waste capture media formulation for capturing and facilitating the disposal of feces and urine from pets and other animals.

BACKGROUND OF THE INVENTION

There is nothing pleasant about cat litter or "kitty litter". Although the product has certainly evolved from the days where sand, ashes or dirt would be used in the litter box, prior art formulations remain little more than an open indoor sewer. There are all sorts of deodorizers and sprays that claim to eliminate cat litter smells but often they just mask the odor short-term.

For today's cat owners, cat litter is as much a necessity as cat food. But, before 1950, most cat boxes were filled with sand, dirt, or ashes instead of the more convenient superabsorbent litters to which cat lovers are now accustomed.

Kitty litter got its start when a neighbor frustrated with her cat tracking ashes throughout the house asked a budding entrepreneur named Edward Lowe for some sand. Lowe, whose family owned an industrial absorbents company, convinced her to try clay instead. Lowe sent the neighbor home with an absorbent clay called Fuller's earth. She loved it and soon would use nothing else in her cat box.

Her enthusiasm spurred Lowe to try to sell the stuff, which he dubbed "Kitty Litter," as a cat box filler. The local pet store owner was doubtful that anyone would pay money for the product when alternatives were available for next to nothing. Lowe began giving his Kitty Litter away for free. Soon, he had satisfied customers willing to pay good money for Kitty Litter. By 1990, Edward Lowe Industries was the largest producer of cat box filler in the U.S.

The secret to Lowe's Kitty Litter is granulated Fuller's earth. Fuller's earth is actually a catchall term for a chemically diverse set of absorbent clay minerals capable of absorbing water. Fuller's earth litters naturally provide some odor control by sequestering urine. But if the soiled litter isn't replaced and urine begins to collect at the bottom of the container, bacteria found in feces will react with the uric acid in cat urine to produce unpleasant-smelling ammonia. Fuller's earth litters can alleviate some of the ammonia odor by trapping the positively charged ammonium ions that are formed when water in urine protonates the ammonia. To improve odor control, cat litter manufacturers use a number of additives, including baking soda to absorb smells, fragrances to mask unpleasant scents, and antibacterial agents to kill odor-causing bacteria. Litter containing antibacterial agents, however, cannot be disposed of in septic systems of some sewer systems because the antibacterial agents may kill the beneficial bacterial at work in these waste disposal systems.

Traditional clay litters like Lowe's original Kitty Litter currently make up about 40% of the cat litter market. But like ashes, dirt, and sand, traditional clay litters must be discarded and replaced fairly often, making cat box cleaning a frequent chore. Unhappy with the inconvenience of traditional litters, biochemist and cat lover Thomas Nelson began investigating alternative clay formulations in the early 1980s. He observed that a certain type of clay called bentonite clumped up in the presence of moisture, allowing waste to be isolated and scooped out, leaving behind clean litter. Today, roughly 60% of the cat litter sold in the U.S. is of the clumping variety, and most of it is made from bentonite clay.

Bentonite is largely composed of montmorillonite, a clay mineral made up of stacks of $SiO_4$ sandwiched between two sheets of octahedrally coordinated aluminum, magnesium, or iron. Substitution of lower valence ions for some of the higher valence ones in the octahedral sheets creates a negative charge imbalance that traps cations, most often sodium or calcium, between the stacked sandwiches.

The absorption power of various types of bentonite is determined by which cation is present and in what amount. Because sodium ions have a larger hydration sphere than calcium ions do, sodium bentonite can absorb more moisture than its calcium counterpart. As a result, sodium-rich bentonite is the material of choice for clumping cat litter. Like traditional clay litters, bentonite litters provide some inherent odor control, thanks to the ability to sequester urine and to trap any $NH_4^+$ produced from urine degradation.

The need exists for an animal litter that (i) can actively neutralize animal urine such as to avoid the release of ammonia, (ii) can form small clumps when contacted by urine to facilitate easy removal, (iii) can provide rapid and long-term odor reduction, (iv) does not contain bactericide, and therefore, may be disposed of in septic and sewage systems without killing the beneficial bacteria in those systems, and (v) is relatively lightweight in comparison to the current leading litter products.

SUMMARY OF THE INVENTION

A waste capture media formulation is presented. The formulation comprises a bacteria package. The bacteria package does not include a bacteria that produces a urease enzyme. The formulation comprises an absorbent media comprising ground pecan shells, an odor suppressant comprising calcium carbonate that neutralizes acid to maintain a suitable environment for the bacteria package, a binding agent comprising guar gum, a mineral source comprising a humic acid salt and an organic mineral compound, a masking agent, and an aqueous surfactant.

A method of preparing a waste capture media formulation is also presented. The method comprises combining a bacteria package, an absorbent media, an odor suppressant, a binding agent, a mineral source, a masking agent, and an aqueous surfactant.

BRIEF DESCRIPTION OF THE DRAWINGS

The invention will be more fully understood by referring to the following Detailed Description Of The Preferred Embodiments in conjunction with the Drawings, of which:

FIG. 1 illustrates a representative chemical structure of an aqueous gel matrix formed from guar gum and calcium cations.

DETAILED DESCRIPTION OF THE PREFERRED EMBODIMENTS

This invention is described in preferred embodiments in the following description with reference to the FIGURES, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. In addition, while terms relating to a cat are used herein (i.e., "cat litter," "feline urine," etc.), it will be appreciated by one of ordinary skill in the art that Applicants' invention may be used to capture and neutralize the waste products many types of pets, including without limitation dogs, rabbits, ferrets, gerbils, hamsters, and reptiles.

Feline urine comprises urea. The "ammonia-like" odor emanating from litter boxes does not arise from urea itself. Rather, the urea 1 is hydrolyzed to carbon dioxide 3 and ammonia 4.

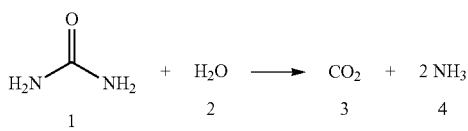

Many bacteria, including for example, *Helicobacter pylori, Klebsiella pneumonia*, all species of *Proteus* and *Micrococcus luteus*, degrade urea in a reaction catalyzed by a urease enzyme. Prior art litter formulations include one or more bactericides to kill bacteria in an effort to mitigate the hydrolysis of urea to ammonia.

In marked contrast with prior art litter formulations which comprise bactericides, Applicants' litter formulation includes a Bacteria package which decomposes urine components, specifically urea. By eliminating urea, the source of foul-smelling ammonia is also eliminated. In certain embodiments, Applicants' bacteria package does not include bacteria that produce the urease enzyme. Applicants' bacteria package is beneficial for septic systems should the litter formulation be discarded into a drain line or sewer system. In addition, Applicants' bacteria package is also beneficial for users that may compost or dispose of waste media into landfills.

In certain embodiments, Applicants' Bacteria package comprises *Bacillus subtilis Bacillus subtilis, Pseudomonas aeruginosa, Pseudomonas fluorescens, Bacillus amyloliquefaciens, Paenibacillus lactis*, or a combination thereof. In certain embodiments, the *Bacillus subtilis* comprises between about 10 weight percent to about 90 weight percent of Applicants' Bacteria package. In certain embodiments, the *Pseudomonas aeruginosa* comprises between about 10 weight percent to about 90 weight percent of Applicants' Bacteria package. In certain embodiments, the *Pseudomonas fluorescens* comprises between about 10 weight percent to about 90 weight percent of Applicants' Bacteria package. In certain embodiments, the *Bacillus amyloliquefaciens* comprises between about 10 weight percent to about 90 weight percent of Applicants' Bacteria package. In certain embodiments, the *Paenibacillus lactis* comprises between about 10 weight percent to about 90 weight percent of Applicants' Bacteria package.

The litter media of Applicants' litter formulation is designed to absorb and form small clumps containing urine waste, providing rapid odor reduction as well as an easy form of waste material removal. Applicants' active culture package targets and degrades the urine component urea, without the production of ammonia.

In certain embodiments, Applicants' litter formulation further comprises ground pecan shells, which comprises an absorbent media based on cellulose and high lignin content and which is beneficial for absorbing and capturing liquid waste through its cellular morphology. In some embodiments, the litter contains varying media sizes to reduce the "tracking" of product on cats' feet and to suppress vapors cause by oxidizing urea and absorption capabilities of cat urine. In other embodiments, the litter contains consistent media sizes. Litter comprising pecan shells is lightweight, resulting in ease of handling. For example, one formulation of Applicants' litter including pecan shells weighed approximately 15 pounds per cubic foot compared to traditional clay-based absorbents which exceed 50 pounds per cubic foot.

In certain embodiments, Applicants' litter formulation further comprises the chemical precursors for calcium bicarbonate. Calcium bicarbonate ($Ca(HCO_3)_2$), also referred to as calcium hydrogencarbonate, exists only in an aqueous solution containing the calcium ($Ca^{2+}$), bicarbonate ($HCO_3^-$), and carbonate ($CO_3^{2-}$) ions, along with dissolved carbon dioxide.

In certain embodiments, Applicants' litter formulation comprises calcium carbonate. The Calcium (bi)carbonate neutralizes uric acid produced by cat urine to provide a better pH balanced environment for Applicants' bacteria package to degrade urea. In addition, the calcium (bi)carbonate comprises an initial and long term odor suppressant, and provides a carrier for litter fragrances.

Applicants' litter formulation further comprises guar gum, which is used as a binding agent for the litter media. Chemically, guar gum 5 is a polysaccharide composed of the sugars galactose and mannose. The backbone is a linear chain of β 1,4-linked mannose residues to which galactose residues are 1,6-linked at every second mannose, forming short side-branches.

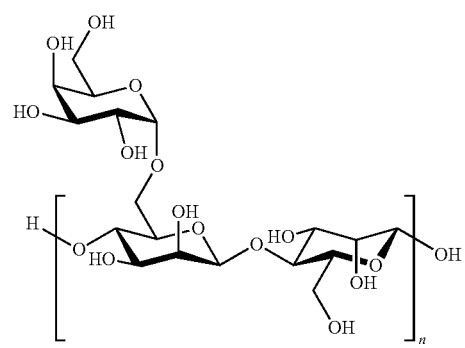

Guar gum is more soluble than locust bean gum and is a better emulsifier as it has more galactose branch points. Unlike locust bean gum, it is not self-gelling. However, calcium can cross-link guar gum, causing it to gel. Guar gum is nonionic and hydrocolloidal in water and is not affected by ionic strength or pH. Strong acids cause hydrolysis and loss of viscosity, and alkalies in strong concentration also tend to reduce viscosity. It is insoluble in most hydrocarbon solvents.

Guar gum shows high low-shear viscosity but is strongly shear-thinning. It is very thixotropic above concentration 1%, but below 0.3% the thixotropy is slight. It has much greater low-shear viscosity than that of locust bean gum, and also generally greater than that of other hydrocolloids.

Guar gum is beneficial through its bonding process for essentially creating a bio-degrading, bio-cell mass for urine. As those skilled in the art will appreciate, animal waste liquid contains a higher percentage of water than solid waste. Upon contact with urine, guar gum bonds the litter media together, facilitating removal of used media from the litter box.

Referring now to FIG. 1, guar gum is soluble in the water portion of cat urine. In addition, the Calcium carbonate element of Applicants' litter is also soluble in the water portion. As illustrated in FIG. 1, guar gum chains 110 and 120 dissolved in cat urine hydrogen bond through a plurality of pendent hydroxyl groups to a calcium cation 130 dissolved in the cat urine to form a three-dimensional gel matrix 100. For clarity purposes FIG. 1 illustrates two guar gum chains and a single Calcium cation. As those skilled in the art will appreciate, upon contact between Applicants' litter formulation and cat urine, a three-dimensional aqueous gel matrix is formed, wherein that gel matrix comprises a plurality of guar gum chains and a plurality of Calcium cations.

As a result, the cat urine is rapidly encapsulated within three-dimensional gel matrix 100. By virtue of this encapsulation, the cat urine is fixated in near proximity to Applicants' bacteria package thereby facilitating the bacterial decomposition of the urea element of the litter. In addition, any ammonia gas that might be formed from the breakdown of urea is entrained within the gel and cannot escape to the ambient environment.

Applicants' litter formulation further comprises organic humate composition. Applicants' humate composition comprises humic acid salt in combination with an organic mineral compound that provides beneficial trace elements for active cultures in the degradation and chelating of urea as well as providing additional absorption and odor control. In certain embodiments, the organic humate mineral comprises one or more mineral compounds, such as carbamide, ammonium nitrate, superphosphate, ammophos, nitroammophoska, superpphoska, azophoska, or sulfoammophos, combined with the humic component, such as the sodium, potassium, calcium, salts of humic acid, and mixtures thereof.

Humic acid comprises acidic materials extracted from leonardite, where those acidic extracts are soluble in alkali, but insoluble in acid, methyl ethyl ketone, and methyl alcohol. As those skilled in the art will appreciate, leonardite comprises a soft, brown coal-like deposit found in conjunction with deposits of lignite.

Applicants' litter formulation further comprises a fragrance composition comprising a masking agent for odors produced by waste material deposited in the litter box, and an aqueous surfactant which facilitates blending of the masking agent with calcium bicarbonate. In certain embodiments, Applicants' surfactant comprises an ethoxylated quaternary ammonium-based surfactant containing approximately 60-95 weight percent of ethoxylated quaternary ammonium salts 6:

$$[R_1R_2R_3N-(CH_2-CH_2-O-)_n-H]^+X^- \qquad 6$$

Wherein R1, R2, and R3, are each independently selected from the group consisting of H, alkyl, phenyl, and benzyl, and wherein (n) is between 1 and about 50.

In different embodiments, Applicants' litter is prepared according to Formulation A through AE in Table A below. Different formulations will be optimal for use depending on the number of cats in the household, the ambient temperature, and the ambient humidity.

TABLE A

| Formulation | Bacteria Package (wt %) | Ground Pecan Shells (wt %) | Calcium Carbonate (wt %) | Guar Gum (wt %) | Organic Humic Composition (wt %) | Masking Agent (wt %) | Aqueous Surfactant (wt %) |
|---|---|---|---|---|---|---|---|
| A | 5 | 40 | 22 | 22 | 11 | 0 | 0 |
| B | 5 | 40 | 13 | 20 | 10 | 7 | 5 |
| C | 8 | 40 | 12 | 12 | 12 | 8 | 8 |
| D | 12 | 40 | 11.9 | 11.9 | 11.9 | 5.4 | 6.9 |
| E | 15 | 40 | 10 | 20 | 5 | 1 | 9 |
| F | 5 | 50 | 10 | 10 | 10 | 10 | 5 |
| G | 5 | 50 | 29 | 5 | 5 | 1 | 5 |
| H | 8 | 50 | 5 | 26 | 5 | 5 | 1 |
| I | 15 | 50 | 5 | 5 | 19 | 1 | 5 |
| J | 20 | 50 | 5 | 5 | 5 | 8 | 7 |
| K | 5 | 60 | 10 | 10 | 4 | 10 | 1 |
| L | 5 | 60 | 8 | 15 | 10 | 1.9 | 0.1 |
| M | 8 | 60 | 3 | 15 | 7 | 0.5 | 6.5 |
| N | 15 | 60 | 6 | 6.8 | 6 | 0.2 | 6 |
| O | 20 | 60 | 4.5 | 5 | 5 | 0.5 | 5 |
| P | 5 | 70 | 7 | 8 | 1.99 | 8 | 0.01 |
| Q | 5 | 70 | 3 | 16 | 3 | 3 | 0 |
| R | 8 | 70 | 7 | 7 | 6.9 | 0.1 | 1 |
| T | 15 | 70 | 2 | 7 | 2 | 2 | 2 |
| U | 20 | 70 | 2 | 2 | 2 | 2 | 2 |
| V | 3 | 80 | 4 | 4 | 4 | 1 | 4 |
| W | 5 | 80 | 2 | 5 | 3 | 3 | 2 |
| X | 8 | 80 | 1 | 1 | 1 | 8 | 1 |
| Y | 10 | 80 | 2 | 3 | 2 | 0 | 3 |
| Z | 10 | 80 | 2 | 2 | 2 | 2 | 2 |
| AA | 3 | 85 | 2 | 3 | 2 | 2 | 3 |
| AB | 3 | 85 | 3 | 3 | 3 | 0 | 3 |
| AC | 3 | 85 | 2.9 | 3 | 3 | 3 | 0.1 |
| AD | 10 | 85 | 1 | 1 | 1 | 1 | 1 |
| AE | 12 | 85 | 1 | 1 | 0.25 | 0.25 | 0.5 |

While specific values have been recited for the various embodiments recited herein, it is to be understood that, within the scope of the invention, the values of all parameters, including amounts and ratios, may vary over wide ranges to suit different applications. For example, different formulations may be better suited to specific animals and different environmental conditions, such as temperature and humidity.

While the invention is described through the above-described exemplary embodiments, it will be understood by those of ordinary skill in the art that modifications to, and variations of, the illustrated embodiments may be made without departing from the inventive concepts disclosed herein. Furthermore, disclosed aspects, or portions of these aspects, may be combined in ways not listed above. Accordingly, while the preferred embodiments of the present invention have been illustrated in detail, it should be apparent that modifications and adaptations to those embodiments may occur to one skilled in the art without departing from the scope of the present invention.

We claim:

1. A waste capture media formulation, comprising:
   a bacteria package;
   ground pecan shells;
   calcium carbonate to neutralize acid in cat urine to maintain a suitable environment for the bacteria package;
   guar gum;
   humic acid salt;
   fragrance; and
   an aqueous surfactant at 8 weight percent, said aqueous surfactant comprising about 60 weight percent to about 95 weight percent ethoxylated quaternary ammonium compound;
   wherein:
   said calcium carbonate and said guar gum are present at the same weight percentage;
   the bacteria package does not include a bacteria that produces a urease enzyme;
   the bacteria package comprises:
   about 10 weight percent to about 90 weight percent *Bacillus subtilis;*
   about 10 weight percent to about 90 weight percent *Pseudomonas aeruginosa;*
   about 10 weight percent to about 90 weight percent *Pseudomonas fluorescens;*
   about 10 weight percent to about 90 weight percent *Paenibacillus lactis;*
   about 10 weight percent to about 90 weight percent *Bacillus amyloliquefaciens.*

2. A waste capture media formulation, comprising:
   a bacteria package;
   an absorbent media at 60 weight percent;
   a binding agent comprising guar gum wherein the guar gum is present at 10 weight percent; and
   a mineral source comprising calcium carbonate wherein the calcium carbonate is present at 10 weight percent;
   wherein said calcium carbonate and said guar gum are present at the same weight percentage.

3. The waste capture media formulation of claim 2, wherein:
   the bacteria package does not include a bacteria that produces a urease enzyme.

4. The waste capture media formulation of claim 2, wherein:
   the bacteria package comprises:
   about 10 weight percent to about 90 weight percent *Bacillus subtilis;*
   about 10 weight percent to about 90 weight percent *Pseudomonas aeruginosa;*
   about 10 weight percent to about 90 weight percent *Pseudomonas fluorescens;*
   about 10 weight percent to about 90 weight percent *Paenibacillus lactis;* and
   about 10 weight percent to about 90 weight percent *Bacillus amyloliquefaciens.*

5. The waste capture media formulation of claim 2, wherein the absorbent media comprises ground pecan shells.

6. The waste capture media formulation of claim 2, further comprising an odor suppressant.

7. The waste capture media formulation of claim 2, further comprising a humic acid salt and an organic mineral compound.

8. The waste capture media formulation of claim 7, wherein the humic acid salt comprises an ion selected from the group consisting of sodium, potassium and calcium.

9. The waste capture media formulation of claim 2, further comprising:
   a fragrance; and
   an aqueous surfactant.

10. The waste capture media formulation of claim 9, wherein the aqueous surfactant comprises about 60 weight percent to about 95 weight percent ethoxylated quaternary ammonia.

11. A method of preparing a waste capture media formulation, comprising combining;
    a bacteria package;
    an absorbent media at 60 weight percent;
    a binding agent comprising guar gum wherein the guar gum is present at 10 weight percent;
    a mineral source comprising calcium carbonate wherein the calcium carbonate is present at 10 weight percent; and
    wherein said calcium carbonate and said guar gum are present at the same weight percentage.

12. The method of preparing a waste capture media formulation of claim 11, wherein the absorbent media comprises ground pecan shells.

13. The method of preparing a waste capture media formulation of claim 11, further comprising humic acid salt and an organic mineral compound.

14. The method of preparing a waste capture media formulation of claim 13, wherein the humic acid salt comprises an ion selected from the group consisting of sodium, potassium and calcium.

15. The method of a waste capture media formulation of claim 11, further comprising a fragrance and an aqueous surfactant.

16. The method of preparing a waste capture media formulation of claim 15, wherein the aqueous surfactant comprises about 60 weight percent to about 95 weight percent ethoxylated quaternary ammonium compound.

\* \* \* \* \*